US012182736B2

(12) United States Patent
Toriumi et al.

(10) Patent No.: US 12,182,736 B2
(45) Date of Patent: Dec. 31, 2024

(54) METHOD FOR ESTIMATING INTRA-BUILDING TRAFFIC, AND SYSTEM FOR ESTIMATING INTRA-BUILDING TRAFFIC

(71) Applicant: Hitachi, Ltd., Tokyo (JP)

(72) Inventors: Wataru Toriumi, Tokyo (JP); Masayasu Fujiwara, Tokyo (JP); Manabu Katou, Tokyo (JP); Rui Ning, Tokyo (JP); Takamichi Hoshino, Tokyo (JP); Takahiro Hatori, Tokyo (JP); Satoru Toriyabe, Tokyo (JP)

(73) Assignee: HITACHI, LTD., Tokyo (JP)

( * ) Notice: Subject to any disclaimer, the term of this patent is extended or adjusted under 35 U.S.C. 154(b) by 1290 days.

(21) Appl. No.: 16/757,807

(22) PCT Filed: Oct. 10, 2018

(86) PCT No.: PCT/JP2018/037722
§ 371 (c)(1),
(2) Date: Apr. 21, 2020

(87) PCT Pub. No.: WO2019/087716
PCT Pub. Date: May 9, 2019

(65) Prior Publication Data
US 2021/0166144 A1 Jun. 3, 2021

(30) Foreign Application Priority Data
Oct. 30, 2017 (JP) ................. 2017-208759

(51) Int. Cl.
G06N 7/00 (2023.01)
B66B 5/00 (2006.01)
(Continued)

(52) U.S. Cl.
CPC ............. *G06N 7/00* (2013.01); *B66B 5/0012* (2013.01); *B66B 5/0037* (2013.01); *G06F 17/16* (2013.01); *G06Q 10/04* (2013.01)

(58) Field of Classification Search
CPC ...... G06N 7/00; B66B 5/0012; B66B 5/0037; G06F 17/16; G06Q 10/04
See application file for complete search history.

(56) References Cited

U.S. PATENT DOCUMENTS 6,394,232 B1    5/2002   Iwata et al.

FOREIGN PATENT DOCUMENTS

| JP | 58-152769 A | 9/1983 |
| JP | 02-132078 A | 5/1990 |

(Continued)

OTHER PUBLICATIONS

Indian Office Action received in corresponding Indian Application No. 202017018153 dated Oct. 19, 2020.

(Continued)

*Primary Examiner* — Jeffrey Donels
(74) *Attorney, Agent, or Firm* — MATTINGLY & MALUR, PC

(57) ABSTRACT

An OD matrix estimation device includes: an extraction unit that, on the basis of intra-bank OD matrixes that show traffic flow information in respective elevator banks in plural elevator banks and transfer floor information about a transfer floor where transfers among the elevator banks is possible, extracts transfer-related intra-bank OD matrixes having a common transfer floor from among the intra-bank OD matrixes; a matching unit that, from among the transfer-related intra-bank OD matrixes extracted by the extraction unit, combines first transfer intra-bank OD matrixes each including OD data in which the transfer floor is defined as an arrival floor with second transfer intra-bank OD matrixes (Continued)

each including OD data in which the transfer floor is defined as a departure floor to create transfer-related OD data; and an estimation unit that estimates OD data for users who transfer and move among the banks.

11 Claims, 16 Drawing Sheets

(51) Int. Cl.
  *G06F 17/16* (2006.01)
  *G06Q 10/04* (2023.01)

(56) References Cited

FOREIGN PATENT DOCUMENTS

| | | |
|---|---|---|
| JP | 05-233594 A | 9/1993 |
| JP | 09-020468 A | 1/1997 |
| JP | 2001-310878 A | 11/2001 |
| JP | 2004-099267 A | 4/2004 |
| JP | 3929580 | 6/2007 |
| WO | WO-2017216416 A1 * | 12/2017 ........... B66B 1/2458 |

OTHER PUBLICATIONS

International Search Report of PCT/JP2018/037722 dated Dec. 18, 2018.

\* cited by examiner

METHOD FOR ESTIMATING INTRA-BUILDING TRAFFIC, AND SYSTEM FOR ESTIMATING INTRA-BUILDING TRAFFIC

TECHNICAL FIELD

The present invention relates to a method for estimating intra-building traffic and a system for estimating intra-building traffic.

BACKGROUND ART

In the case of examining the appropriate operation of elevators in a building or planning the renewal of the elevators for improving the usability of the elevators, it is important to grasp the traffic demand in the building first and foremost.

In Patent Literature 1, a device for estimating an OD matrix (Origin-Destination Matrix) is proposed that shows a traffic flow showing from which floors of elevators to which floors users move on the basis of the operation data of the elevators including the number of getting-on passengers and the number of getting-off passengers in the elevators at each floor and the push-down timings of the buttons of the cars of the elevators.

As for the derivation of an OD matrix, it has been sufficient in the past that an OD matrix regarding the in-service floors of one elevator bank (group) can be derived on the basis of the operation data of the elevator bank. Conventionally, there have been few buildings where users transfer from one elevator bank to another elevator bank, so that there has been no need to grasp the states of the transfer movements. Actually, Patent Literature 1 discloses a method for estimating an OD matrix regarding movements at a single elevator bank.

CITATION LIST

Patent Literature

Patent Literature 1: Japanese Patent Application Laid-Open Publication No. 58-152769

SUMMARY OF INVENTION

Technical Problem

As buildings become large-scale and complex today, the number of buildings where transfers between elevator banks are needed is increasing more and more, so that a need for grasping the states of transfer movements has been growing. However, because there is no mechanism in which data regarding plural banks is combined in the method described in Patent Literature 1, an OD matrix of the entirety of a building, in which transfers among elevators are taken into consideration, cannot be calculated.

Accordingly, the object of the present invention is to provide a method for estimating intra-building traffic and a system for estimating intra-building traffic that allow the estimation of an OD matrix of the entirety of plural elevator banks in a building in consideration of transfers (transfer movements) among the elevator banks.

Solution to Problem

In order to solve the above problem, an OD matrix estimation device according to the present invention includes: an extraction unit that, on the basis of intra-bank OD matrixes that show traffic flow information in respective elevator banks in plural elevator banks and transfer floor information about a transfer floor where transfers among the elevator banks is possible, extracts transfer-related intra-bank OD matrixes having a common transfer floor from among the intra-bank OD matrixes; a matching unit that, from among the transfer-related intra-bank OD matrixes extracted by the extraction unit, combines first transfer intra-bank OD matrixes each including OD data in which the transfer floor is defined as an arrival floor with second transfer intra-bank OD matrixes each including OD data in which the transfer floor is defined as a departure floor to create transfer-related OD data; and an estimation unit that, from the transfer-related OD data obtained through combination processing by the matching unit, estimates OD data for users who transfer and move among the banks to create a plural-bank OD matrix that is an OD matrix of the entirety of the plural banks.

Advantageous Effects of Invention

According to the present invention, it becomes possible to provide a method for estimating intra-building traffic and a system for estimating intra-building traffic that allow the estimation of an OD matrix of the entirety of plural elevator banks in a building in consideration of transfers (transfer movements) among the elevator banks.

DESCRIPTION OF EMBODIMENTS

Hereinafter, examples will be explained with reference to the accompanying drawings.

Example 1

Figure 1:
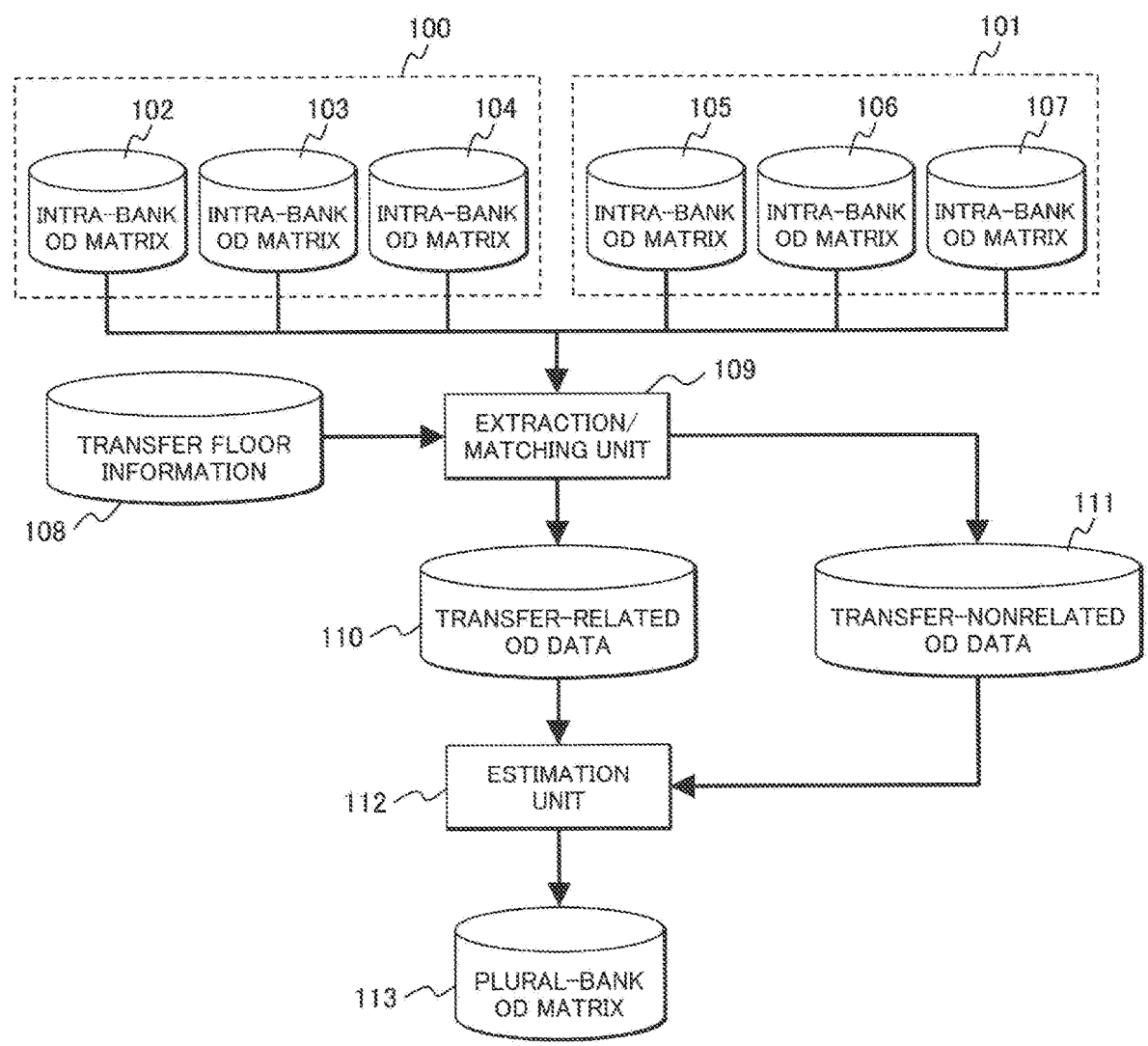
FIG. 1 is a diagram showing an example of a system configuration and a data flow in a method for estimating a plural-bank OD matrix according to the present invention.

An example of a system configuration of an embodiment according to the present invention will be explained with reference to FIG. 1. FIG. 1 is a diagram showing an example of a system configuration and a data flow in a method for estimating a plural-bank OD matrix according to the present invention.

Information of intra-bank OD matrixes 102, 103, 104, 105, 106, and 107, which is data of OD matrixes at the in-service floors of the respective banks and estimated from the number of getting-on passengers and the number of getting-off passengers in elevators and the push timings of respective buttons using, for example, the method disclosed on Patent Literature 1, is recorded in plural elevator groups (banks) 100 and 101 that are related with the elevator transfers of users.

Here, although the number of banks that include the intra-bank OD matrix data 102, 103, 104, 105, 106, and 107 in FIG. 1 is two, that is, the banks are a bank 1 (101) and a bank 2 (102), the number of banks can be three or larger, and additionally, the number of the intra-bank OD matrixes can be larger or smaller than the number shown in FIG. 1.

First, the intra-bank OD matrixes 102, 103, 104, 105, 106, and 107 in the respective banks as well as transfer floor information 108 that is data about floors and banks where transfers are made are inputted into an extraction/matching unit 109.

In the extraction/matching unit 109, transfer-related intra-bank OD matrixes having a common transfer floor are extracted from the input intra-bank OD matrixes in the respective banks, and OD data in which information about the number of getting-on passengers and the number of getting-off passengers are recorded is extracted from the intra-transfer-related bank OD matrixes. In addition, transfer-related OD data 110, where OD data in which the transfer floor is defined as an arrival floor and OD data in which the transfer floor is defined as a departure floor are allocated to transfer movement patterns in a one-to-one manner, is created.

Furthermore, OD data that is not extracted by the extraction/matching unit 109 is separately outputted as transfer-nonrelated OD data 111.

The outputted transfer-related OD data 110 and transfer-nonrelated OD data 111 are inputted into an estimation unit 112. In the estimation unit 112, OD data for users who transfer and move among elevators is estimated from the transfer-related OD data 110, and the OD data for the users is combined with the transfer-nonrelated OD data 111 to create a plural-bank OD matrix 113 that is an OD matrix of the entirety of the plural banks.

Hereinafter, the details of data and processing in this configuration will be explained.

Figure 2:
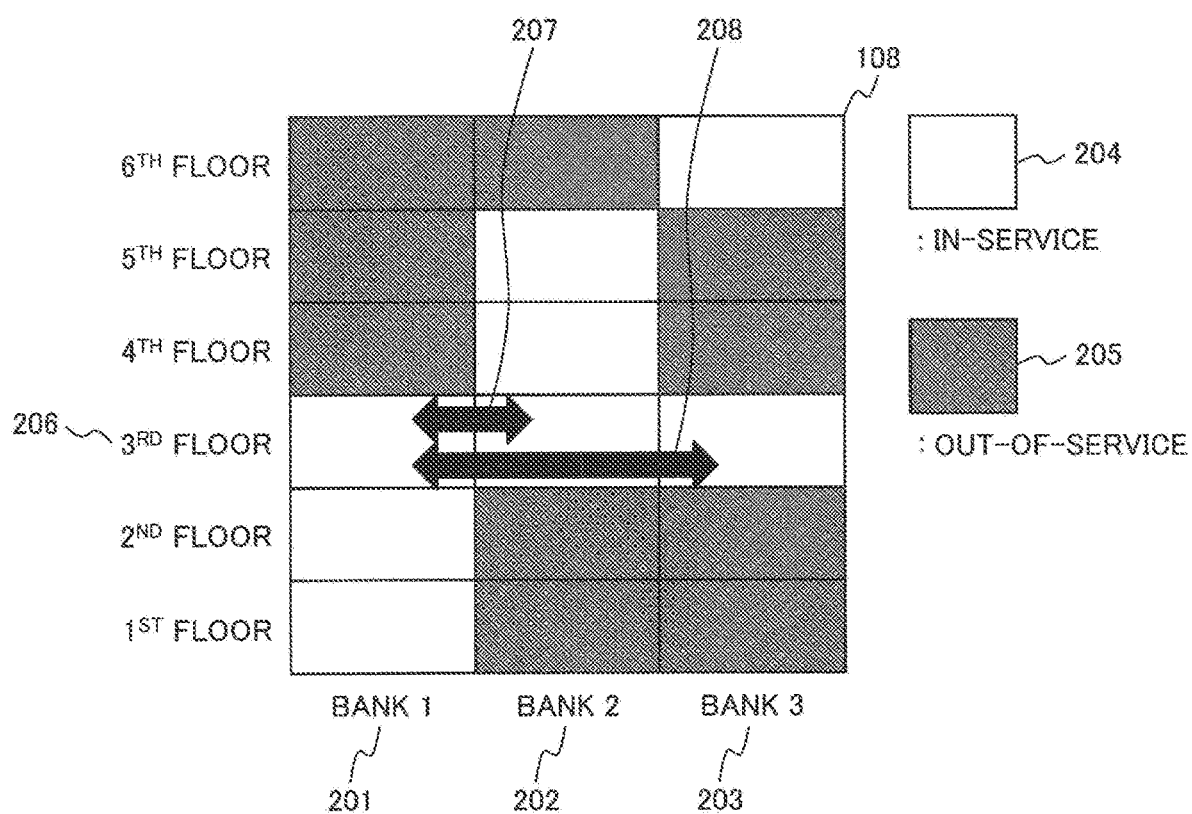
FIG. 2 is a diagram showing an example of transfer floor information in a building that is taken up in the present invention.

First, the transfer floor information 108 will be explained with reference to FIG. 2. The transfer floor information 108 is information showing from which banks to which banks transfers can be made at which floors, and, for example, as shown in FIG. 2, the service floors and transfer floor of each elevator bank are shown.

The service floors of the respective banks shown by a bank 1 (201), a bank 2 (202), and a bank 3 (203) are classified according to the presence or absence 204 (in-service), 205 (out-of-service) of the service. Furthermore, information 207 showing that transfer can be made between the bank 1 and the bank 2 at the transfer floor, that is, at the $3^{rd}$ floor, and information 208 showing that transfer can be made between the bank 1 and the bank 3 at the transfer floor, that is, at the $3^{rd}$ floor are stored. The explanation about the transfer floor information 108 is as mentioned above.

Figure 3:
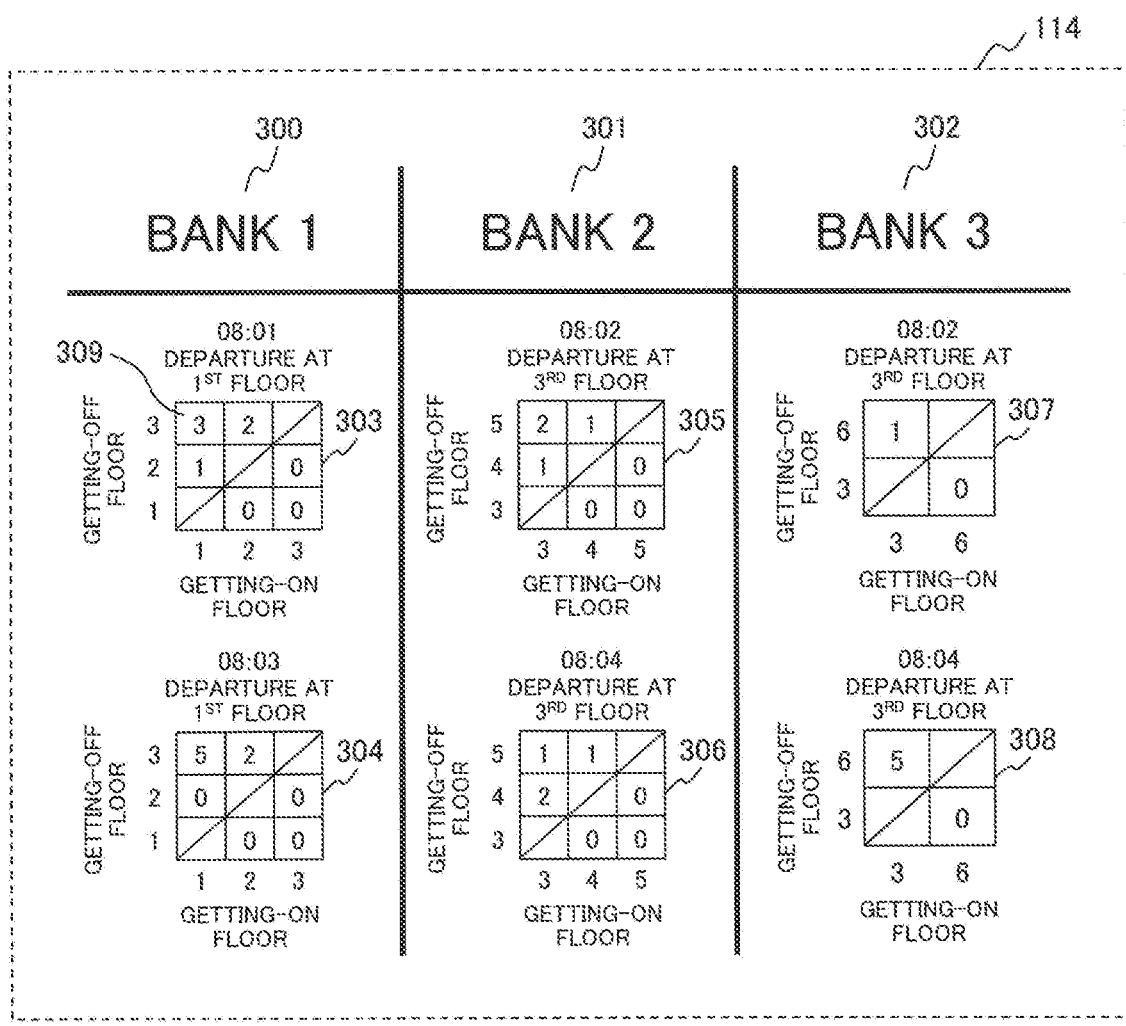
FIG. 3 is a diagram showing an example of intra-bank matrixes that are respectively created from plural elevator banks and that are taken up in the present invention.

Next, the description about the intra-bank matrixes 102, 103, 104, 105, 106, and 107 will be made with reference to FIG. 3. An intra-bank OD matrix 114 is matrix data describing the getting-on floors and the getting-off floors of passengers at the in-service floors of the respective banks. For example, the point that there are three passengers in an elevator that left the $1^{st}$ floor at 08:01 for the $3^{rd}$ floor can be read out from a component 309. An intra-bank OD matrix such as intra-bank OD matrixes 303, 304, 305, 306, 307, or 308 is given in such a way that the intra-bank OD matrix is associated with the departure time of the relevant elevator. Such an association way with the departure times of elevators is adopted because an OD matrix is calculated for every moving up or moving down of an elevator when the OD matrix is calculated using elevator operation data.

An OD matrix that is calculated for every operation of an elevator in such a way is referred to as a predefined time OD matrix in the present invention. On the other hand, the association way of time data is not equal to the above way. For example, there is a way in which the numbers of persons who move during a specified time interval such as a time interval "08:30 to 08:35" are summed up. Such an association way as this can be obtained by summing up OD matrixes included in the relevant time interval. An OD matrix that is associated with a specified time interval is referred to as a specified time interval OD matrix in the present invention. In addition, some of components of an OD matrix pulled out from the OD matrix are referred to as OD data in the present invention.

Next, pieces of processing performed in this example will be explained below. As shown in FIG. 1, main pieces of processing are two pieces of processing performed by the extraction/matching unit 109 and the estimation unit 112. Each of the above pieces of processing will be explained in detail hereinafter.

First, the extraction/matching unit 109 will be explained. In the extraction/matching unit 109, as mentioned above, OD data regarding the transfer floor is extracted from the input intra-bank OD matrixes in the respective banks, and transfer-related OD data 110, where OD data in which the transfer floor is defined as an arrival floor and OD data in which the transfer floor is defined as a departure floor are allocated to the transfer movement patterns in a one-to-one manner, is created. Herewith, because OD data regarding persons who arrive at the transfer floor and OD data regarding persons who depart from the transfer floor, which are necessary in order to estimate OD data regarding transfer movement between elevators, are obtained as sets, a preparation to estimate the plural-bank OD matrix 113 is completed.

Figure 4:
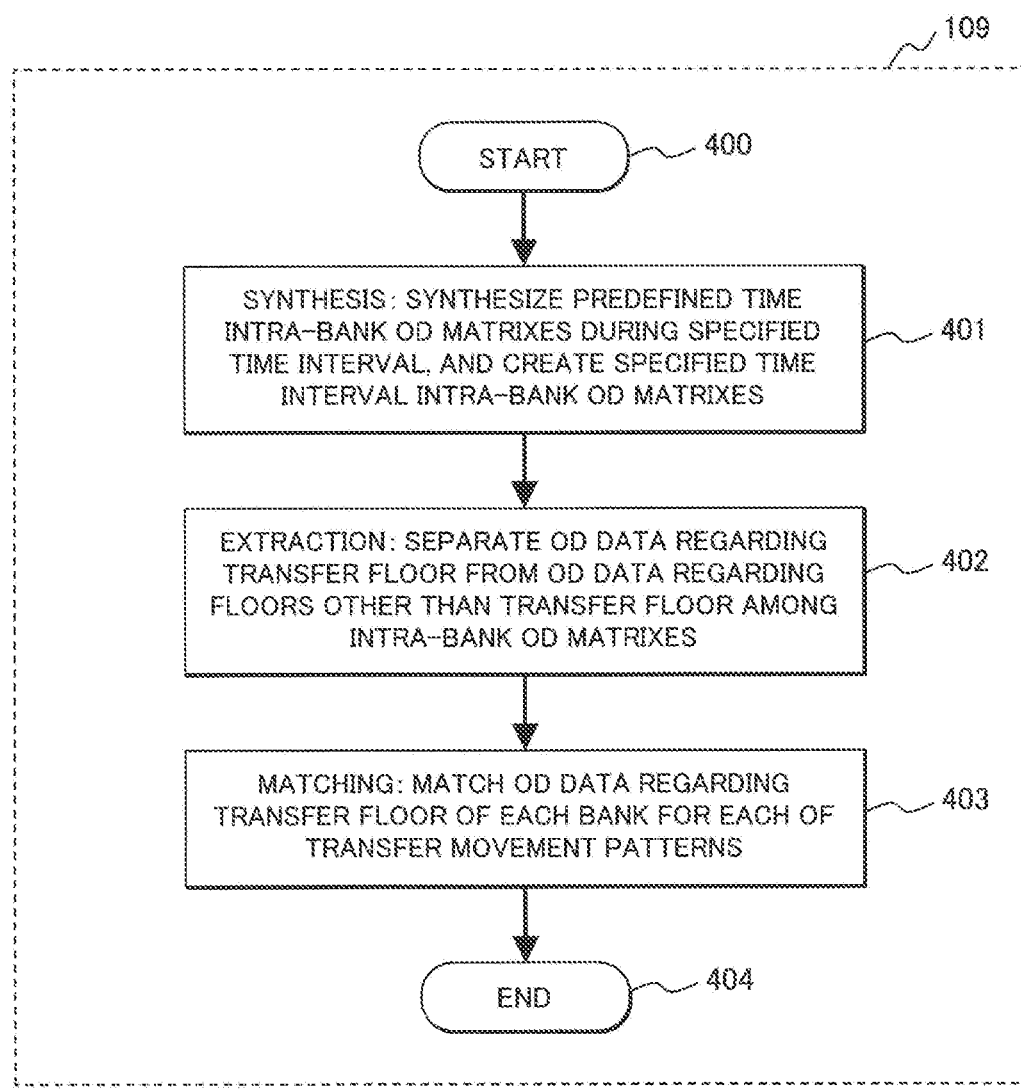
FIG. 4 is a diagram showing an example of the content of processing of an extraction/matching unit in the present invention.

Processing performed by the extraction/matching unit 109 will be explained in detail with reference to FIG. 4. The processing includes three processes performed by a synthesis unit 401, an extraction unit 402, and a matching unit 403.

First, the synthesis unit 401 will be explained. In the synthesis unit 401, by synthesizing predefined time intra-bank OD matrix 114 during a specified time interval, specified time interval intra-bank OD matrixes are created. For example, it will be assumed that bank OD matrixes 303, 304, 305, 306, 307, and 308 are given, and specified time intervals are given in units of five minutes from 08:00. In this case, processing in which intra-bank OD matrixes during a time interval "08:00 to 08:05" are added for each bank is performed. In other words, a process of adding the matrixes 303 and 304, a process of adding the matrixes 305 and 306, and a process of adding the matrixes 307 and 308 are executed.

Figure 5:
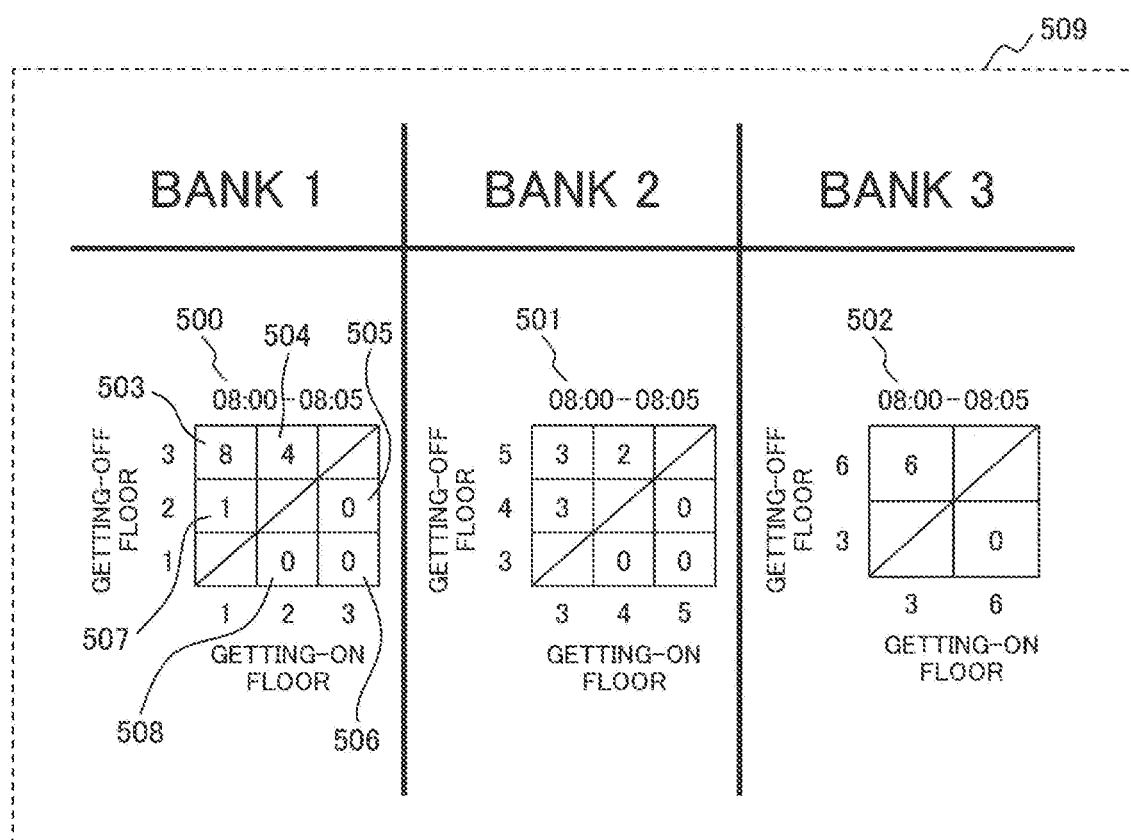
FIG. 5 is a diagram showing the result of processing of a synthesis unit in the present invention.

As a result of the above processes, specified time interval intra-bank matrixes 500, 501, and 502 in FIG. 5 are obtained respectively. With the execution of the above processes, the predefined time intra-bank OD matrixes are converted into the specified time interval intra-bank OD matrixes. In this case, it is not always necessary to set the lengths of the time intervals equal to one another, and it is conceivable that a time interval is set so short that data obtained from one operation of each of elevators in each bank can be combined. The explanation about the synthesis unit 401 is as mentioned above.

Next, the extraction unit 402 will be explained. In the extraction unit 402, a process of separating OD data regarding the transfer floor from OD data regarding floors other than the transfer floor among the specified time interval intra-bank OD matrixes obtained by the synthesis unit 401 is performed.

Figure 6:
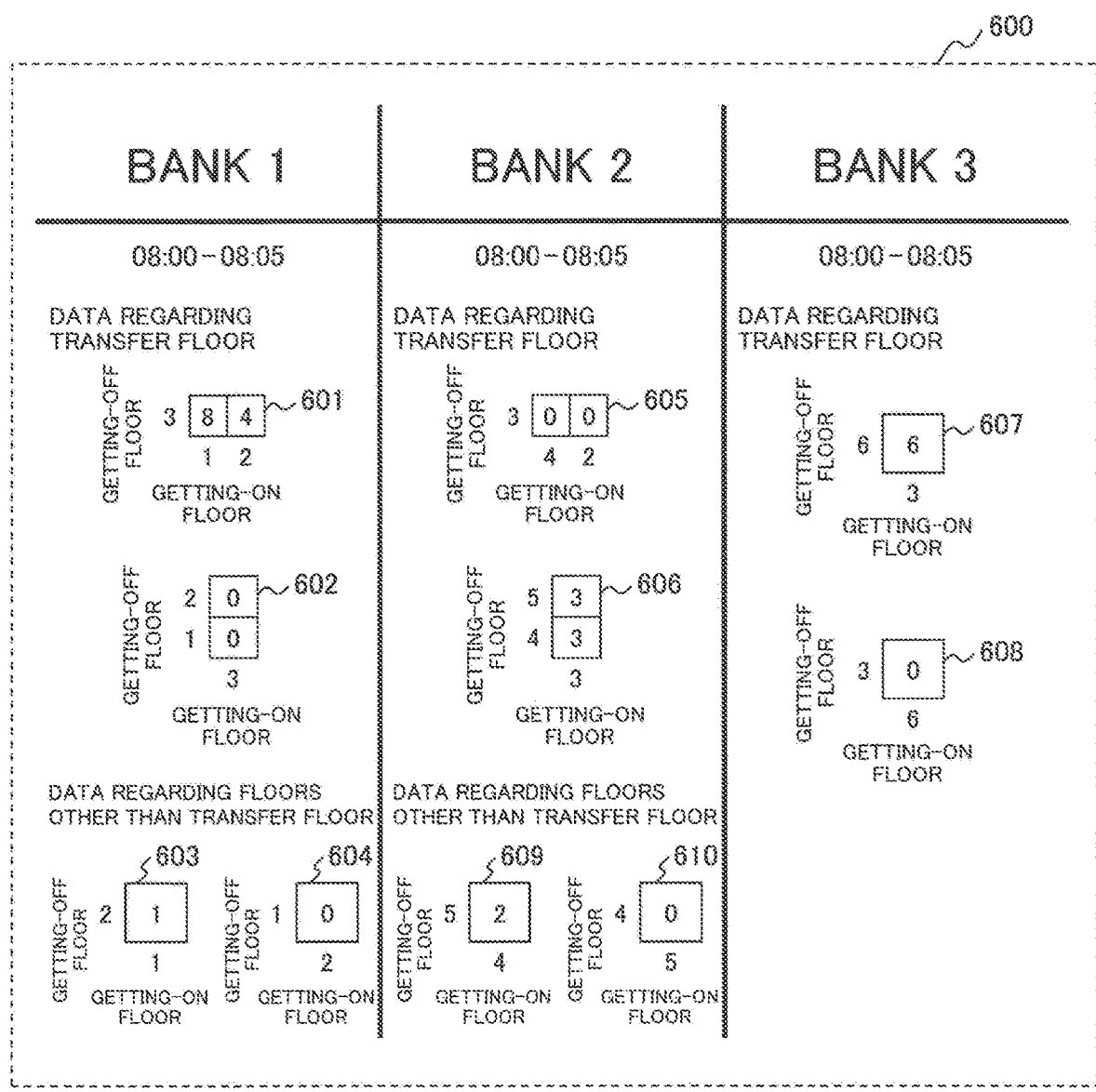
FIG. 6 is a diagram showing the result of processing of an extraction unit in the present invention.

For example, it will be assumed that this process is applied to the specified time interval intra-bank OD matrixes 500, 501, and 502 shown in FIG. 5. Furthermore, it will be assumed that, as the transfer floor information, the information 207 showing that transfer can be made between the bank 1 and the bank 2 at the $3^{rd}$ floor, and the information 208 showing that transfer can be made between the bank 1 and the bank 3 at the $3^{rd}$ floor is given in FIG. 2. Under these assumptions, a process of separating data regarding the transfer floor, that is, the $3^{rd}$ floor from data regarding floors other than the $3^{rd}$ floor is performed. A result of the above process is shown in FIG. 6. Taking the matrix 500 for example, data 503 and 504 the getting-off floor of which is the $3^{rd}$ floor and data 505 and 506 the getting-on floor of which is the $3^{rd}$ floor are classified as data 601 and 602 regarding the transfer floor. On the other hand, data 507 and 508 other than the above data are classified as data 603 and 604 regarding floors other than the transfer floor, and the data 507 and 508 are outputted into the estimation unit 112 as transfer-nonrelated OD data 111. Because the OD data regarding the transfer floor is extracted by the above process, data used for estimating transfer movements can be separated from other data. The explanation about the extraction unit 402 is as mentioned above.

Successively, the matching unit 403 will be explained. In the matching unit 403, OD data in which the transfer floor is defined as an arrival floor and OD data in which the transfer floor is defined as a departure floor are allocated to the transfer movement patterns given by the transfer floor information 108 in a one-to-one manner.

For example, it will be assumed that data 600 is obtained in the extraction unit 402. First, the transfer movement patterns are cited on the basis of the transfer floor information 108. In this case, there are four patterns, that is, transfer movement patterns from the bank 1 to the bank 2, from the bank 1 to the bank 3, from the bank 2 to the bank 1, and from the bank 3 to the bank 1. Next, OD data in which the transfer floor is defined as an arrival floor and OD data in which the transfer floor is defined as a departure floor are allocated to the transfer movement patterns in a one-to-one manner.

Figure 7:
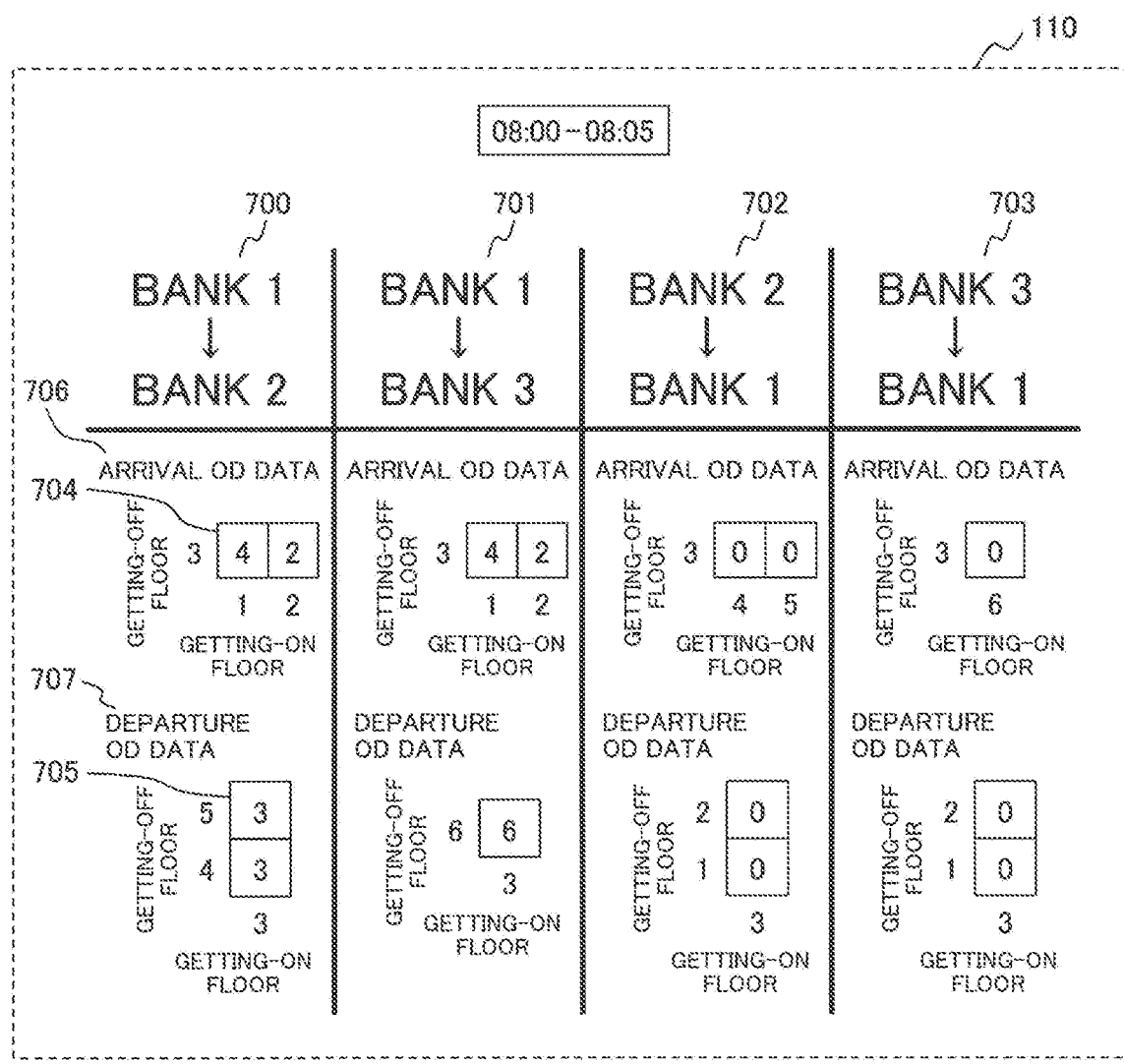
FIG. 7 is a diagram showing the result of processing of a matching unit in the present invention.

However, in the case where the same bank is used by plural transfer patterns, data of the relevant bank is divided among the plural transfer patterns. As a result of applying the above allocation method to the data 600, data shown in FIG. 7 is obtained. Taking a transfer pattern 700 from the bank 1 to the bank 2 for example, OD data of the bank 1 is allocated as data in which the transfer floor is defined as a getting-off floor, and OD data of the bank 2 is allocated as data in which the transfer floor is defined as a getting-on floor.

In other words, the data 601 is allocated from the data of the bank 1, and data 606 is allocated from the data of the bank 2. Here, the data of the bank 1 in which the transfer floor, that is, the $3^{rd}$ floor is defined as a getting-off floor is also used for a transfer pattern from the bank 1 to the bank 3.

Therefore, the data of the bank 1 is divided between these transfer patterns. The division can be done in such a way that, for example, the ratio of the total movement amounts of respective banks in each of which the transfer floor is defined as a getting-on floor is taken into consideration. To put it concretely, the total movement amount of the bank 2, in which the transfer floor, that is, the $3^{rd}$ floor is defined as a departure floor, is six persons with reference to data 606, and the total movement amount of the bank 3 is also six persons with reference to data 607, so that, in this case, the data 601 can be allocated to the transfer pattern from the bank 1 to the bank 2 and to the transfer pattern from the bank 1 to the bank 3 at the rate of 1 to 1.

By performing the above processing, data 704 and data 705 are allocated to the transfer pattern from the bank 1 to the bank 2. After the similar processing is performed on all other transfer patterns, the transfer-related OD data 110 is obtained. Here, OD data in which the transfer floor is defined as a getting-off floor is referred to as arrival OD data 706, and OD data in which the transfer floor is defined as a getting-on floor is referred to as departure OD data 707. The transfer-related OD data 110 is outputted to the estimation unit 112, and the processing performed by the matching unit 403 is completed. Through the above processing, because OD data regarding persons who arrive at the transfer floor and OD data regarding persons who depart from the transfer floor, which are necessary in order to estimate OD data regarding transfer movement between elevators, are obtained as a set, a preparation to estimate the plural-bank OD matrix 113 is completed. The explanation about the matching unit 403 is as mentioned above.

Next, the estimation unit 112 will be explained. In the estimation unit 112, the OD data regarding transfer movement between elevators is estimated on the basis of the transfer-related OD data 110 outputted from the extraction/matching unit 109, and by combining this data with the transfer-nonrelated OD data 111 outputted from the extraction/matching unit 109, the plural-bank OD matrix 113 is created.

Figure 8:
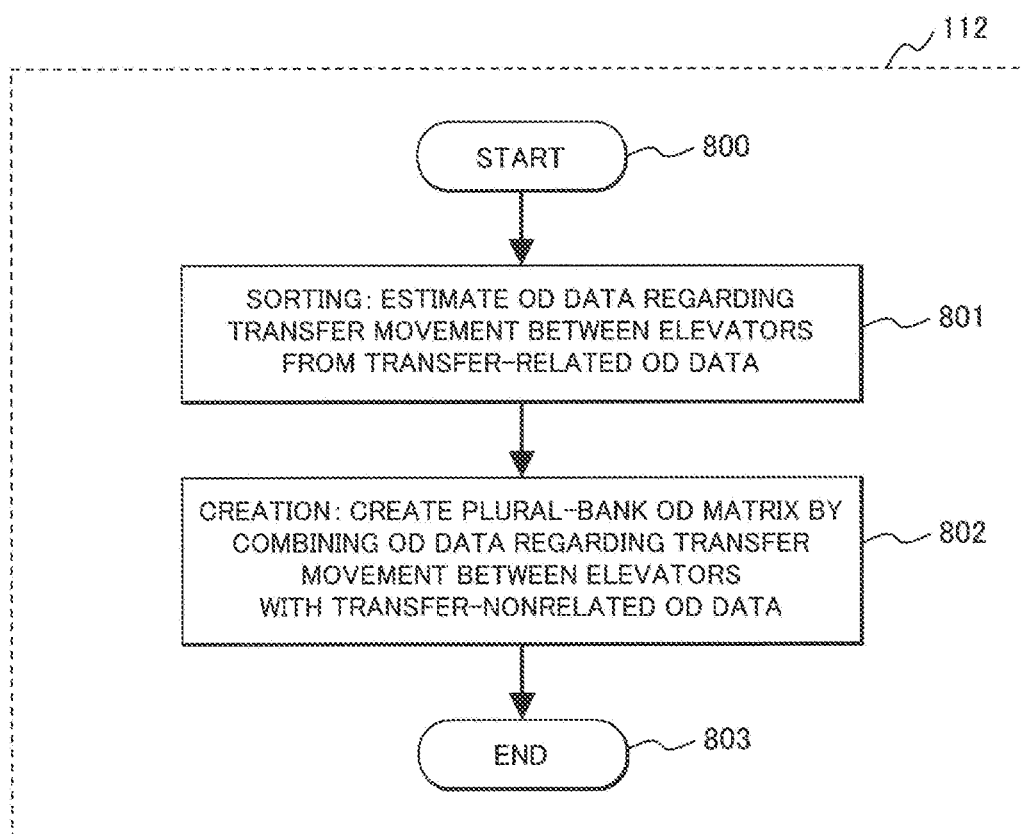
FIG. 8 is a diagram showing the content of processing of an estimation unit in the present invention.

The details of the processing will be explained below with reference to FIG. 8. The processing includes two processes, that is, one performed by a sorting unit 801 and the other performed by a creation unit 802.

First, the sorting unit 801 will be explained. In the sorting unit 801, the OD data regarding transfer movement between elevators is estimated from the transfer-related OD data 110 obtained by the extraction/matching unit 109.

Figure 9:
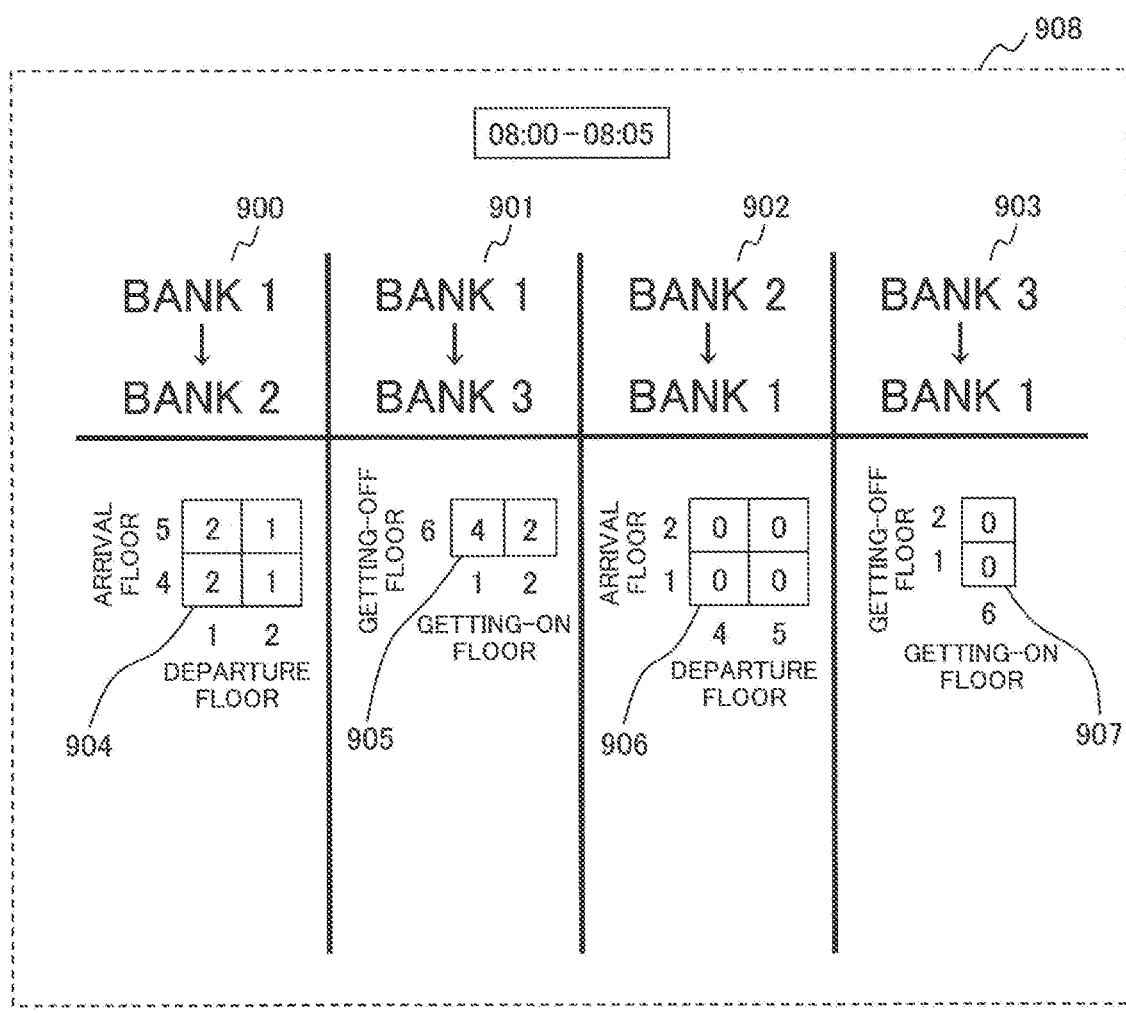
FIG. 9 is a diagram showing the result of sort processing after the sort processing in the present invention.

As an estimation method, a method in which the values shown by the departure OD data 707 are allocated on the basis of the ratio shown by the arrival OD data 706 can be adopted. When this method is applied to the data 704 and the data 705, the estimation result of data 904 shown in FIG. 9 is obtained. As can be read out from the data 904, three persons at each of $4^{th}$ floor and $5^{th}$ floor of the data 705 are divided on the basis of the ratio of the number of persons 4:2 shown by the data 704. When similar operations are executed on all the other transfer-related OD data 110, OD data 908 regarding transfer movement between elevators is obtained. The processing of the sorting unit 801 is as mentioned above.

Next, the creation unit 802 will be explained. In the creation unit 802, the plural-bank OD matrix 113 is created by combining the OD data 908 regarding transfer movement between elevators with the transfer-nonrelated OD data 111.

Figure 10:
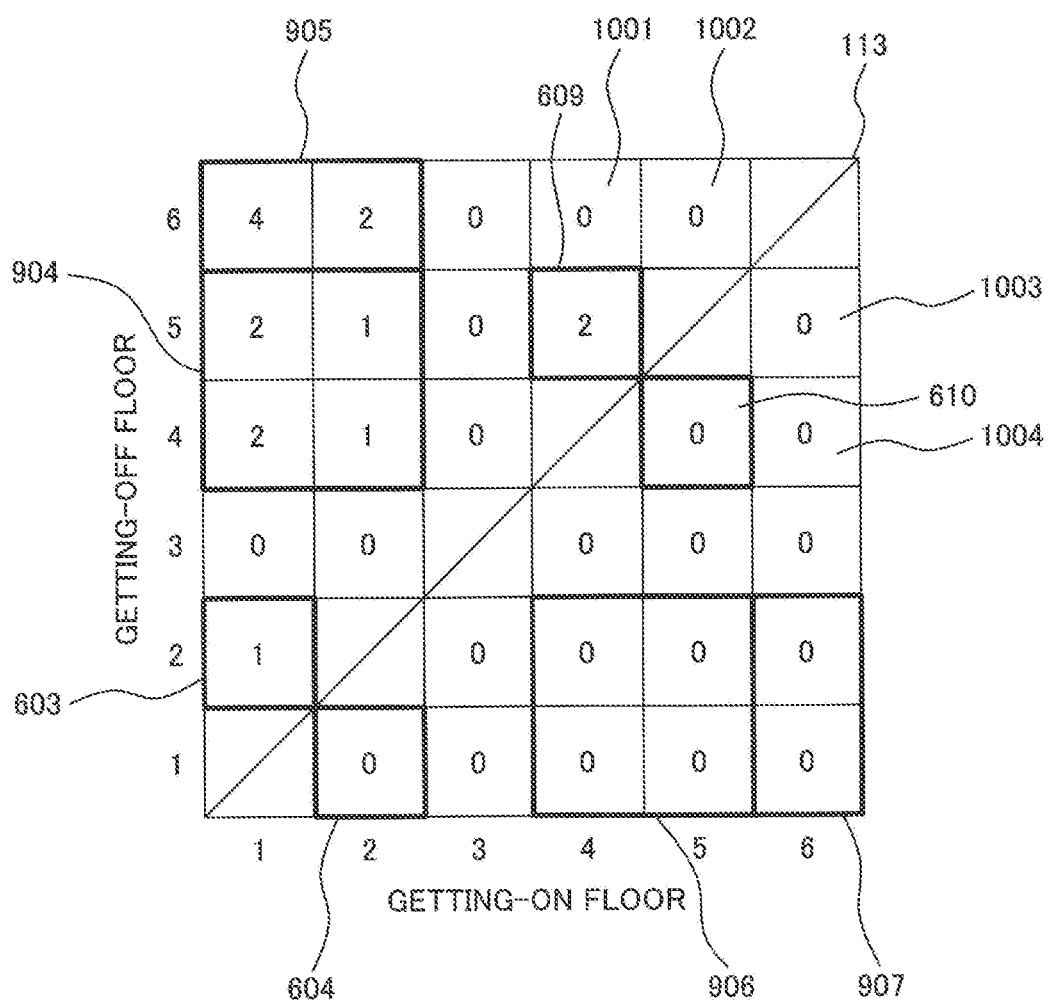
FIG. 10 is a diagram showing a plural-bank OD matrix obtained by processing in the present invention.

In an example using FIG. 6 and FIG. 9, by combining the data 904, 905, 906, and 907 as the OD data regarding transfer movement between elevators with the data 603, 604, 609, and 610 as the transfer-nonrelated OD data, the plural-bank OD matrix 113 in FIG. 10 is obtained. The data 904, 905, 906, and 907, and the data 603, 604, 609, and 610 are respectively allocated to data regarding the relevant floors. Here, it will be assumed that there are no persons who use the transfer floor, that is, the $3^{rd}$ floor as a getting-on floor or a departure floor.

In addition, because it will be assumed that there are no transfers between the bank 2 and the bank 3 as can be seen from the transfer floor information 108, there are no transfer movements between the $4^{th}$ floor and $5^{th}$ floor, which belong to only the bank 2, and the $6^{th}$ floor, which belongs to only the bank 3. In other words, data 1001, 1002, 1003, and 1004 are null. The obtained plural-bank OD matrix 113 is outputted, and the processing by the creation unit 802 is finished.

Example 2

In Example 2, by adding some pieces of processing to the processing of the extraction/matching unit 109, it is expected that the accuracy of the estimation of the plural-bank OD matrix 113 is improved. Because the processing of an estimation unit in this example is the same as the processing of the estimation unit in Example 1, the explanation thereabout is omitted.

Figure 11:
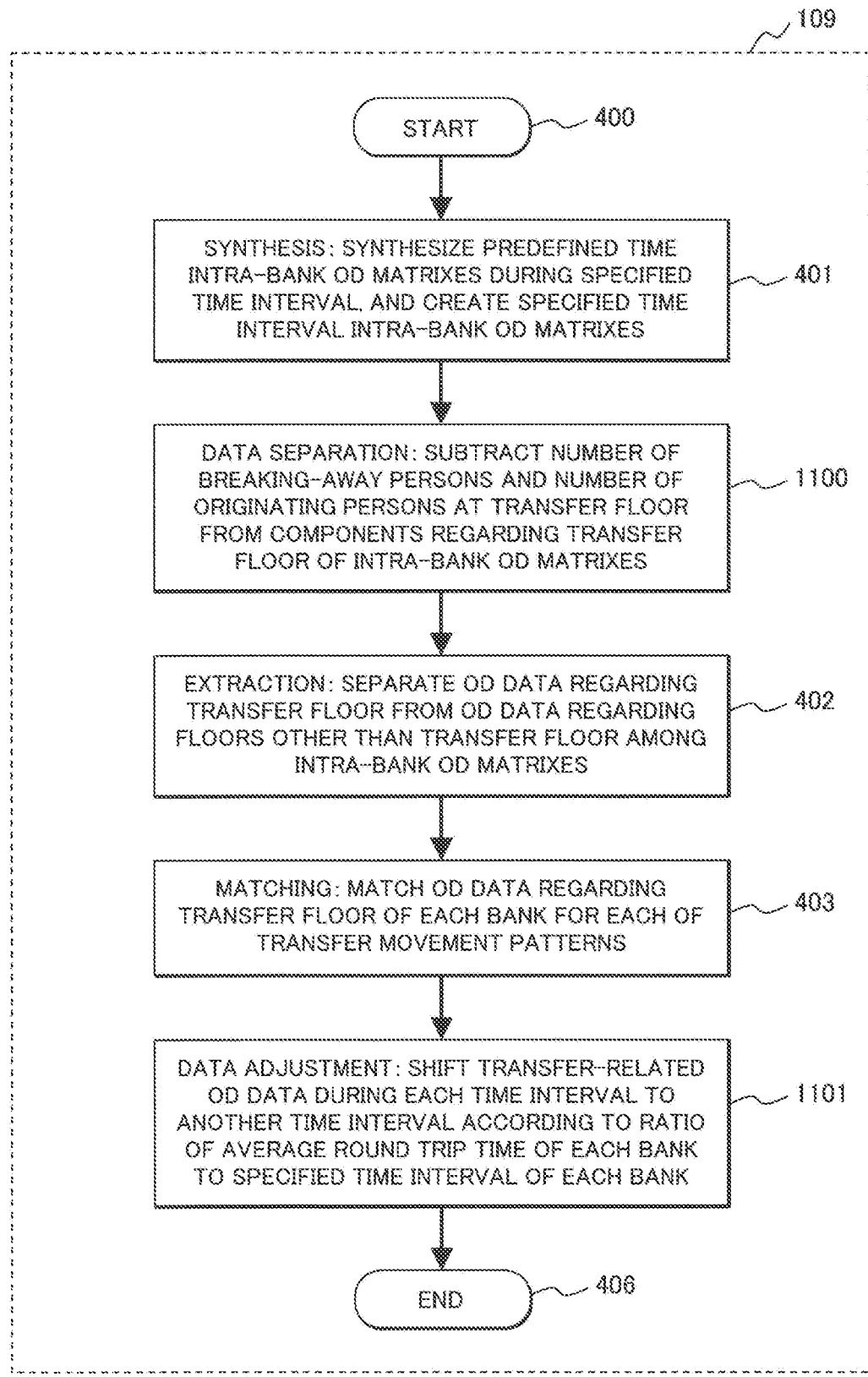
FIG. 11 is a diagram showing an example of the contents of processing of an extraction/matching unit in the present invention.

The processing performed by an extraction/matching unit 109 will be explained with reference to FIG. 11. In the processing shown in FIG. 11, a data separation unit 1100 and a data adjustment unit 1101 are added in comparison with the processing shown in FIG. 4 in Example 1. Because the contents of pieces of processing performed by a synthesis unit 401, an extraction unit 402, and a matching unit 403 are equivalent to those performed in Example 1, the explanations thereabout are omitted.

Figure 12:
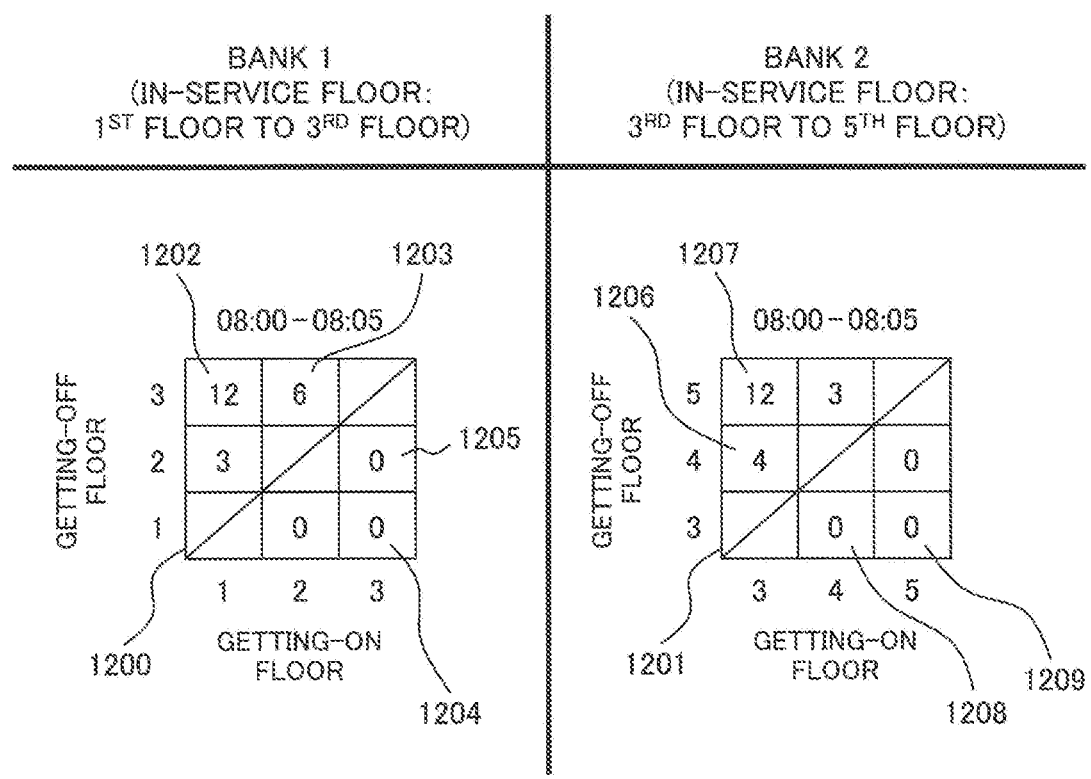
FIG. 12 is a diagram showing an example of inputs into a data separation unit in the present invention.

The contents executed by the data separation unit 1100 will be explained. In the data separation unit 1100, processing in which, by subtracting the number of persons breaking away and the number of persons originating at the transfer floor from the intra-bank OD matrixes of the respective banks in advance, persons who transfer and persons who do not transfer at the transfer floor are separated, is performed, where the above numbers are newly given as input numbers. Hereinafter, the contents of the above processing will be explained using an example. It will be assumed that, as a result of the processing performed by the synthesis unit 401, data 1200 and 1201 shown in FIG. 12 are obtained. Furthermore, it will also be assumed that data that the number of persons breaking away is 6 and the number of persons originating is 4 during a time interval "08:00 to 08:05" at the transfer floor, that is, the $3^{rd}$ floor is given. If there are an observation platform and shops at the transfer floor, data that is obtained from them can be adopted.

Figure 13:
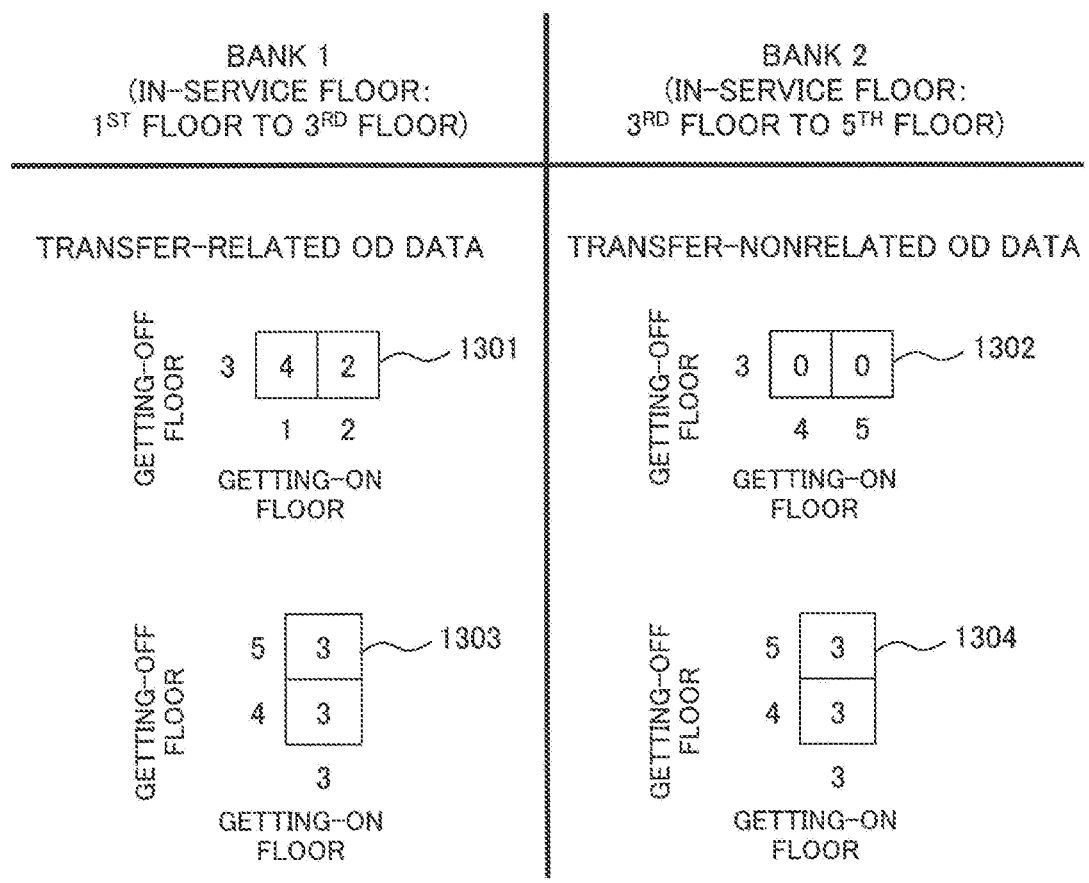
FIG. 13 is a diagram showing OD data regarding a transfer floor separated by the data separation unit in the present invention.

First, the allocation of the number of the persons breaking away is executed. The number 6 of the persons breaking away is associated with data in which the $3^{rd}$ floor is defined as a getting-off floor in the OD matrixes of the bank 1 and the bank 2. In FIG. 12, data 1202, 1203, 1208, and 1209 fall under the above data. The number of the persons breaking away is allocated on the basis the ratio of these data pieces. In other words, the number 6 of the persons breaking away is allocated to 4, 2, 0, and 0 on the basis of the ratio of 12:6:0:0. The numbers of the persons breaking away allocated as above are subtracted from the intra-bank OD data 1200 and 1201, and the numbers of the persons breaking away are outputted as transfer-nonrelated OD data 111 as shown by data 1301 and 1302 in FIG. 13.

Similar processing is also performed on the number of the persons originating. In the allocation of the number of the persons originating, consideration should be paid to OD data in which the transfer floor, that is, the $3^{rd}$ floor is defined as a getting-on floor. In FIG. 12, data 1204, 1205, 1206, and 1207 fall under the above data. The number 4 of the getting-on persons is allocated to 0, 0, 1, and 3 on the basis of the ratio of 0:0:4:12 of these data pieces. The numbers of the getting-on persons allocated as above are subtracted from the intra-bank OD data 1200 and 1201, and the numbers of the getting-on persons are outputted as transfer-nonrelated OD data 111 as shown by data 1303 and 1304 in FIG. 13.

Figure 14:
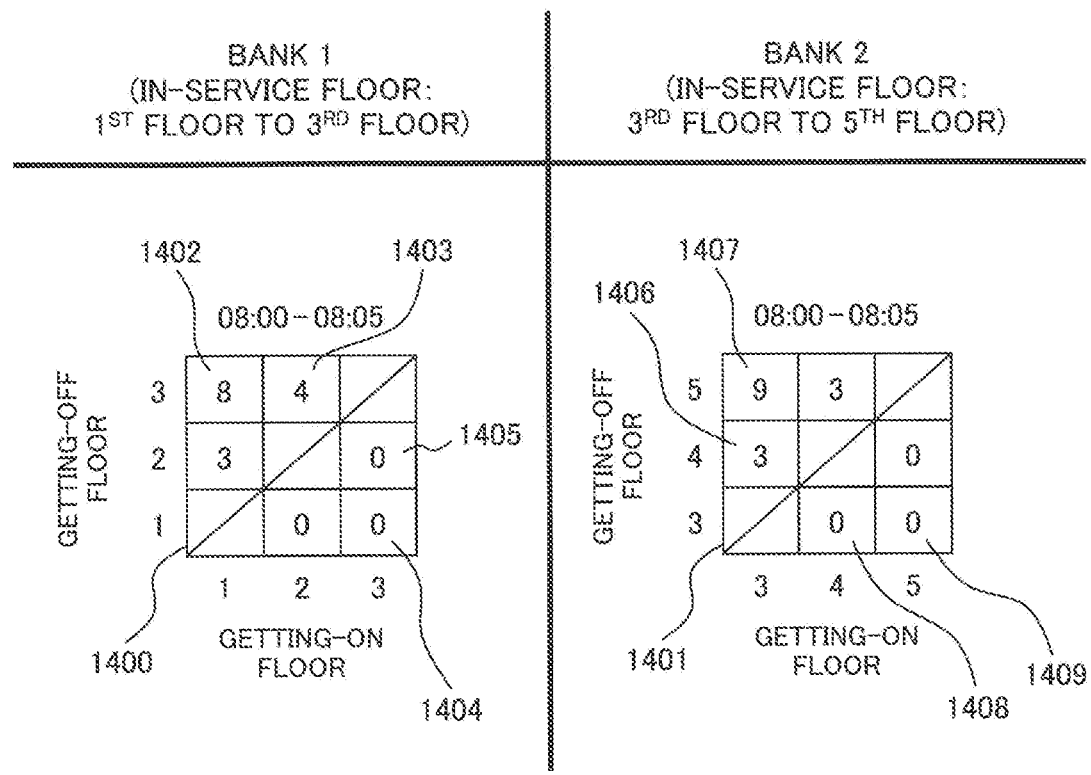
FIG. 14 is a diagram showing the result of processing of the data separation unit in the present invention.

After the above processing is finished, matrixes 1400 and 1401 are obtained as the OD matrixes of the bank 1 and the bank 2 in FIG. 14. Because the numbers of the persons breaking away 1301 and 1302 and the numbers of persons originating 1303 and 1304 at the transfer floor are subtracted from OD data 1402, 1403, 1404, 1405, 1406, 1407, 1408, and 1409 regarding the transfer floor in these intra-bank OD matrixes, all the OD data 1402, 1403, 1404, 1405, 1406, 1407, 1408, and 1409 can be treated as data regarding transferring. The processing of the data separation unit 1100 is as mentioned above.

Owing to this processing, the plural-bank OD matrix 113, which is finally obtained, includes the OD data regarding the transfer floor. Therefore, in the case where there are an observation platform and shops in the transfer floor and all persons do not immediately transfer at the transfer floor, the accuracy of the estimation of the plural-bank OD matrix 113 is expected to be improved. The explanation about the data separation unit 1100 is as mentioned above.

Next, the data adjustment unit 1101 will be explained. In the data adjustment unit 1101, the values of the departure OD data 707 regarding the transfer floor are adjusted with reference to the average round trip time of each bank which is newly given as an input value. To put it concretely, a part of the value of the departure OD data 707 is shifted to the values of the departure OD data in the previous time interval, where the part is decided by the ratio of the average round trip time to the time interval of each OD data. Owing to this processing, a possibility that the number of persons originating regarding transferring can be classified into the accurate time interval becomes higher, so that the accuracy of the estimation of the OD data regarding transfer movement between elevators 908 is expected to be improved.

Figure 15:
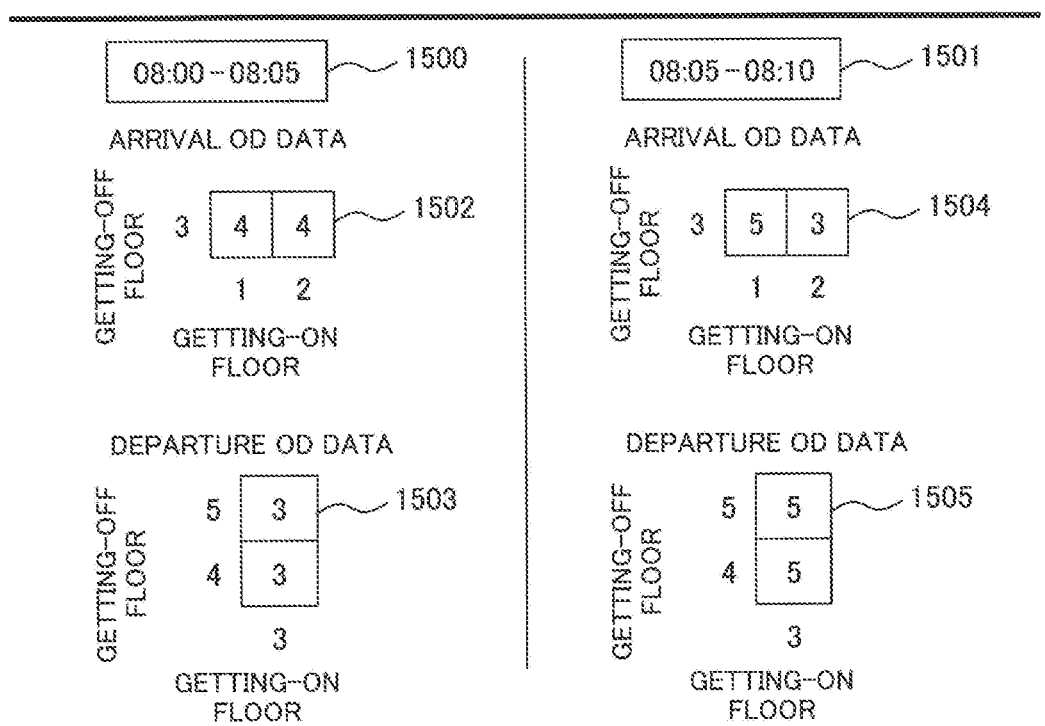
FIG. 15 is a diagram showing an example of inputs into the data adjustment unit in the present invention.

Hereinafter, the above processing will be explained using a numerical example. It will be assumed that data 1502, 1503, 1504, and 1505 shown in FIG. 15 are given at the time when the processing by the matching unit 403 is finished. As can be read out from time interval data 1500 and 1501, the arrival OD data 1502 and 1504 and the departure OD data 1503 and 1505 are respectively allocated to two time intervals "08:00 to 08:05" and "08:05 to 08:10". In this case, if one minute is given to the average round trip time of the bank 1, users who depart the transfer floor, that is, the $3^{rd}$ floor during a time interval "08:05 to 08:06" are considered to have appeared at the $1^{st}$ floor or $2^{nd}$ floor during a time interval "08:04 to 08:05" which is one minute earlier than the time interval "08:05 to 08:06". Because OD data is estimated on the basis of their origination times, it is necessary to reclassify data regarding such users into the time interval "08:00 to 08:05".

Figure 16:
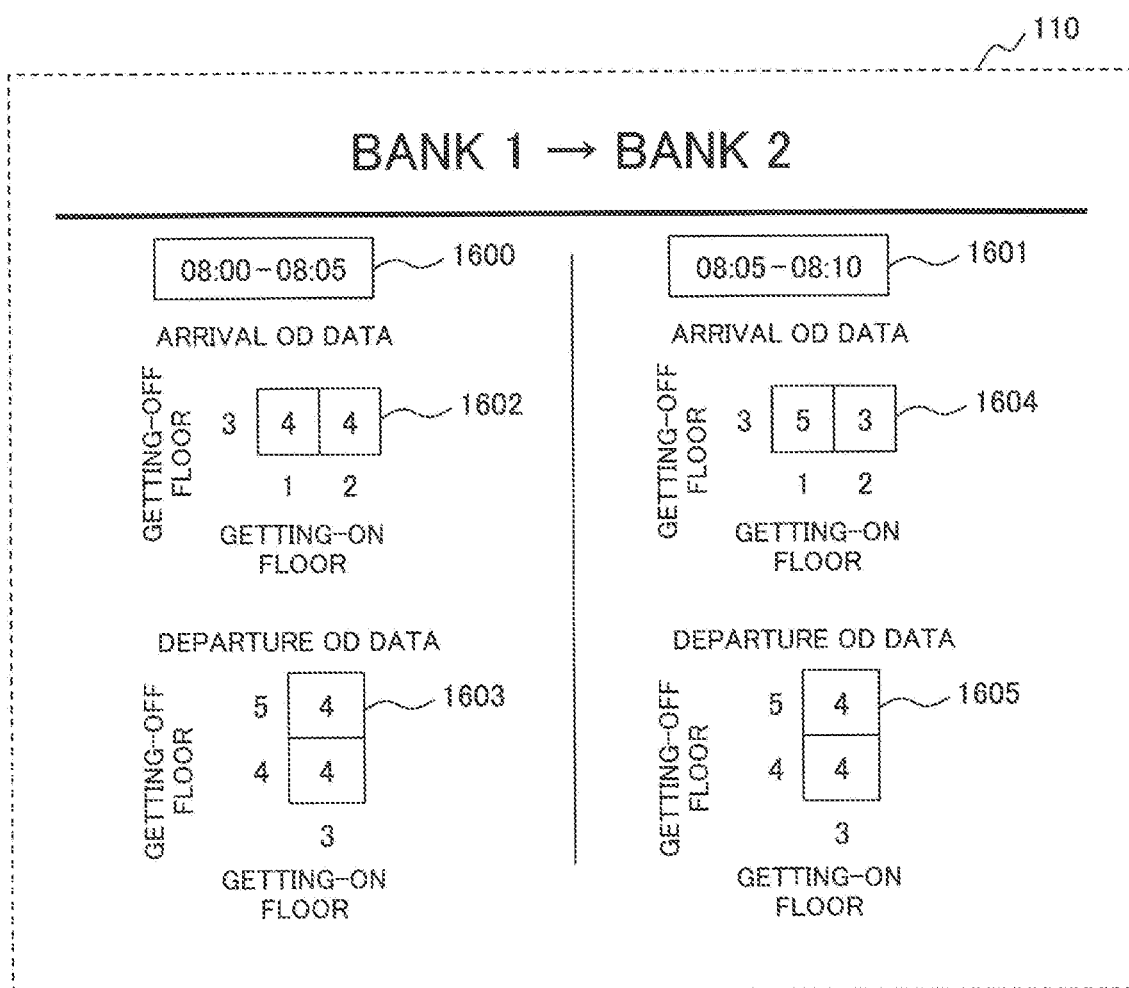
FIG. 16 is a diagram showing the result of processing of a data adjustment unit in the present invention.

Therefore, taking the ratio of the average round trip time one minute to the time interval five minutes of the OD data, that is, 1/5 into consideration, 1/5 of the departure OD data 1505 during the time interval "08:05 to 08:10" is shifted to the departure OD data 1503 during the previous time interval, that is, during the time interval "08:00 to 08:05". After the above processing is performed, FIG. 16 is obtained. As can be read out from departure OD data 1603 and 1605, 1/5 of the data during the time interval "08:05 to 08:10" is shifted to the data during the time interval "08:00 to 08:05".

With this, it is expected that the estimation of the OD data regarding transfer movement between elevators can be carried out under the condition that departure times at respective transfers and movements are grasped more accurately. The processing performed by the data adjustment unit is finished when a combination of the arrival OD data and the departure OD data on which the above adjustment is carried out is outputted to the estimation unit 112 as transfer-related OD data 110. The explanation about the data adjustment steps is as mentioned above.

REFERENCE SIGNS LIST

100, 101 . . . Bank, 108 . . . Transfer Floor Information, 109 . . . Extraction/Matching Unit, 110 . . . Transfer-Related OD Data, 111 . . . Transfer-Nonrelated OD Data, 112 . . . Estimation Unit, 113 . . . Plural-Bank OD Matrix

The invention claimed is:

1. An OD matrix estimation device comprising:
   an extraction unit that, on a basis of intra-bank OD matrixes that show traffic flow information in respective elevator banks in a plurality of elevator banks and transfer floor information about a transfer floor where transfers among the elevator banks are possible, extracts transfer-related intra-bank OD matrixes having a common transfer floor from among the intra-bank OD matrixes;
   a matching unit that, from among the transfer-related intra-bank OD matrixes extracted by the extraction unit, combines first transfer intra-bank OD matrixes each including OD data in which the transfer floor is defined as an arrival floor with second transfer intra-bank OD matrixes each including OD data in which the transfer floor is defined as a departure floor to create transfer-related OD data; and
   an estimation unit that, from the transfer-related OD data obtained through combination processing by the matching unit, estimates OD data for users who transfer and move among the banks to create a plural-bank OD matrix that is an OD matrix of the entirety of the plurality of banks.

2. The OD matrix estimation device according to claim 1, wherein each of the intra-bank OD matrixes is a predefined time intra-bank OD matrix that shows traffic flow information for one operation at a predefined time.

3. The OD matrix estimation device according to claim 1, further comprising a synthesis unit that, on a basis of predefined time intra-bank OD matrixes that show traffic flow information for one operation at a predefined time, creates specified time interval intra-bank OD matrixes by synthesizing the predefined time intra-bank OD matrixes during a specified time interval,
   wherein the extraction unit extracts the transfer-related intra-bank OD matrixes from among the specified time interval intra-bank OD matrixes synthesized by the synthesis unit.

4. The OD matrix estimation device according to claim 3, further comprising a separation unit that separates OD data regarding the transfer floor from OD data regarding floors other than the transfer floor from among the transfer-related intra-bank OD matrixes,
   wherein the matching unit, from the OD data regarding the transfer floor created by the separation unit, combines OD data in which the transfer floor is defined as an arrival floor with OD data in which the transfer floor is defined as a departure floor to create the transfer-related OD data.

5. The OD matrix estimation device according to claim 4, wherein the matching unit makes a combination by allocating OD data in which the transfer floor is defined as an arrival floor and OD data in which the transfer floor is defined as a departure floor to each of transfer patterns.

6. The OD matrix estimation device according to claim 4, further comprising a data adjustment unit that shifts some of OD data in which the transfer floor is defined as an arrival floor included in the first transfer-related OD matrixes to OD data in which the transfer floor is defined as an arrival floor during another time interval in accordance with the ratio of an average round trip time to the specified time interval on a basis of the average round trip time representing an average moving time of an elevator of each bank,
   wherein the matching unit creates the transfer-related OD data by combining the OD data adjusted by the data adjustment unit.

7. The OD matrix estimation device according to claim 2, further comprising a data separation unit that, on a basis of a number of persons breaking away and a number of persons originating at the transfer floor during a specified time interval, subtracts the number of the persons breaking away and the number of the persons originating from components at the transfer floor of the specified time interval intra-bank OD matrixes and components regarding the transfer floor of the predefined time intra-bank OD matrixes,
   wherein the matching unit creates the transfer-related OD data from among the specified time interval intra-bank OD matrixes or the predefined time intra-bank OD matrixes processed by the data separation unit.

8. The OD matrix estimation device according to claim 3, further comprising a data separation unit that, on a basis of a number of persons breaking away and a number of persons originating at the transfer floor during the specified time interval, subtracts the number of the persons breaking away and the number of the persons originating from components regarding the transfer floor of the specified time interval intra-bank OD matrixes or components regarding the transfer floor of the predefined time intra-bank OD matrixes,
   wherein the matching unit creates the transfer-related OD data from among the specified time interval intra-bank OD matrixes or the predefined time intra-bank OD matrixes processed by the data separation unit.

9. The OD matrix estimation device according to claim 1, wherein the estimation unit estimates the OD data for users who transfer and move among the banks by sorting the values of the respective components of the OD data in which the transfer floor is defined as a departure floor in accordance with the ratio between the numbers of persons shown by the components of respective departure floors in the OD data in which the transfer floor is defined as an arrival floor.

10. The OD matrix estimation device according to claim 4, wherein the estimation unit, after estimating the OD data for users, creates the plural-bank OD matrix by synthesizing the OD data regarding floors other than the transfer floor.

11. An OD matrix estimation method comprising the steps of:
- extracting, on a basis of intra-bank OD matrixes that show traffic flow information in respective elevator banks in a plurality of elevator banks and transfer floor information about a transfer floor where transfers among the elevator banks are possible, transfer-related intra-bank OD matrixes having a common transfer floor from among the intra-bank OD matrixes;
- matching in which, from among the transfer-related intra-bank OD matrixes extracted by the extraction unit, first transfer intra-bank OD matrixes each including OD data in which the transfer floor is defined as an arrival floor is combined with second transfer intra-bank OD matrixes each including OD data in which the transfer floor is defined as a departure floor to create transfer-related OD data; and
- estimating, from the transfer-related OD data obtained by combining by the matching unit, OD data for users who transfer and move among the banks to create a plural-bank OD matrix that is an OD matrix of the entirety of the plurality of banks.

* * * * *